June 6, 1950 L. B. GREEN 2,510,693
FASTENING MEMBER
Filed March 29, 1944
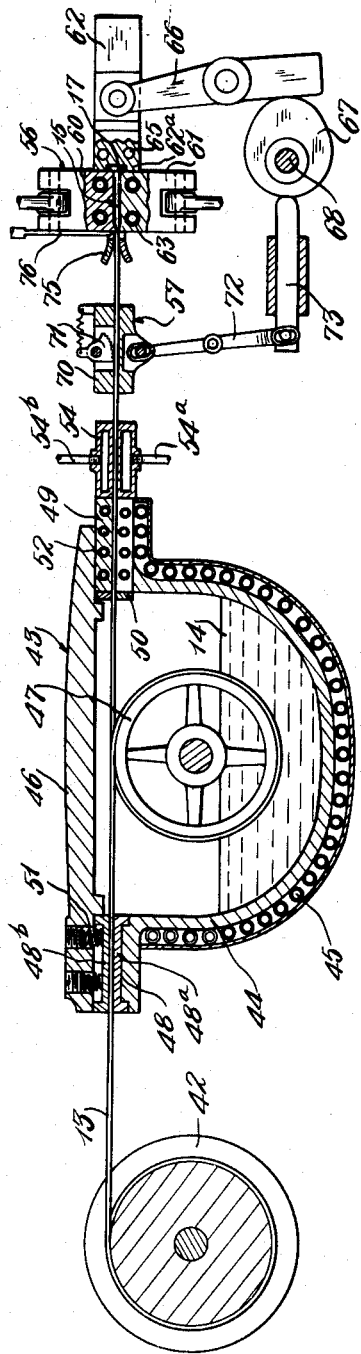
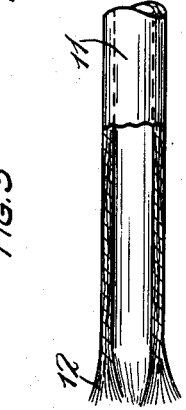
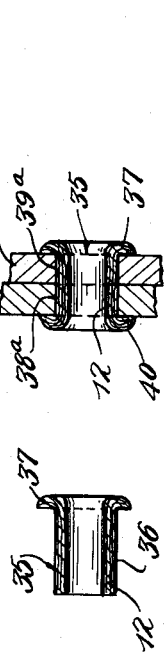
INVENTOR.
LEE B. GREEN
BY
Kwis Hudson, Boughton & Williams
ATTORNEYS Patented June 6, 1950

2,510,693

UNITED STATES PATENT OFFICE 2,510,693

FASTENING MEMBER

Lee B. Green, Lakewood, Ohio

Application March 29, 1944, Serial No. 528,593

4 Claims. (Cl. 85—1)

This invention relates to fastening members and, more specifically, aims to provide a novel form of construction for nails, screws, rivets, staples and the like.

Another object of this invention is to provide a novel form of construction for fastening members of the kind mentioned, in which such members are made of plastic material having a fibrous reinforcing medium therein.

A further object of the present invention is to provide a novel and economical form of construction and for fastening members of the kind having a stem portion and a head or holding portion, and in which such members are made of a plastic material and having reinforcing fibers therein extending along the stem portion and into the head or holding portion.

Still another object of this invention is to provide a novel form of construction for composite fastening members of the character mentioned, in which the plastic material is a so-called thermoplastic material so as to render certain of such fastening members susceptible of desired operations such as upsetting, thread-rolling or the like.

The present invention also provides a novel form of composite stock suitable for various uses including the production of different forms of fastening members.

Other objects and advantages of the present invention will be apparent from the following description and accompanying drawing in which:

Fig. 1 is an elevational view, partly in section and more or less diagrammatic in form, illustrating my novel composite fastening members;

Figs. 2, 3 and 4 are longitudinal sectional views of novel fastening members of the present invention, Fig. 2 showing a nail, Fig. 3 showing a screw and Fig. 4 showing a rivet;

Fig. 5 is a sectional view showing a fastening formed with the rivet of Fig. 4;

Fig. 6 is a longitudinal sectional view showing a staple produced according to this invention;

Fig. 7 is an elevational view, partly in section, showing composite or reinforced plastic stock of tubular form;

Fig. 8 is a longitudinal sectional view of a hollow rivet produced by the present invention; and Fig. 9 is a sectional view showing a fastening in which the hollow rivet of Fig. 8 is used.

As already indicated in a general way, this invention provides novel forms of non-metallic composite or reinforced plastic fastening members. At this point of the description it is sufficient to explain that the invention provides reinforced plastic stock from which the above mentioned fastening members can be made, and which stock can be either in the form of a solid rod 10 as shown in Fig. 1 or in the form of a hollow rod 11 as shown in Fig. 7. The stock is a solidified plastic material having reinforcing fibers 12 running substantially longitudinally therein and, as hereinafter explained in detail, is formed by impregnating a fibrous strand 13 with a suitable thermoplastic material 14.

In the drawing I have shown, by way of example, several fastening members which can be produced from the above mentioned fiber-reinforced plastic stock. In Fig. 2 I show one of such fastening members in the form of a nail 15 having a stem 16 which is pointed at one end as indicated at 16a and is provided at its other end with an integrally formed upset head or holding portion 17.

The plastic nail 16 can be used as a fastening member in constructing or repairing furniture, for securing roofing material in place and for many other uses in which conventional metal nails have been employed heretofore. The nail 15 can be driven in the same manner as a conventional metal nail and, depending upon the character of the material into which it is to be driven, may or may not require a preformed hole.

In Fig. 3 I show a fastening member in the form of a screw 18 made of fiber-reinforced plastic stock. The screw here shown comprises a stem 19 having an external helical thread 20 rolled thereon and a head or holding portion 21 formed integral with such stem. This screw can be made by first producing a fiber-reinforced thermoplastic screw blank having a cylindrical stem and then rolling the thread 20 on such stem by the use of threading dies similar to the conventional thread rolling dies used for producing metal screws but which are heated to cause sufficient softening of the plastic material to enable the thread 20 to be formed.

The screw 18 can be screwed into a tapped opening or into a conventional nut, and can be used for many clamping or fastening purposes where conventional metal screws have been used heretofore.

The fastening member shown in Fig. 4 is a rivet 22 made of fiber-reinforced thermoplastic material or stock. The rivet comprises a stem or shank 23 and an upset integral head 24 at one end of such stem.

An important feature involved in each of the headed fastening members shown in Figs. 2, 3 and 4 is that the reinforcing fibers 12 of the plastic material from which these members are made, run longitudinally of the stems of these members and extend therefrom into the preformed head or holding portion. These fibers extend into the head in laterally spreading relation so that all portions of the head will be reinforced by such fibers and cracking or breaking of the head will be prevented. By thus extending the reinforcing fibers from the stem into the head of the fastening member the head will be strongly joined to the stem and there will be little likelihood of the head breaking from the stem.

In Fig. 5, I show a fastening formed by the use of the rivet 22 of Fig. 4. The fastening here shown comprises a pair of plates 26 and 27 which are held in connected relation by means of the rivet 22. The rivet extends through preformed openings 26a and 27a of the plates and has its head or connecting portion 24 lying on one side of the plates and an upset head 28 on the opposite sides of the plates. In producing such a fastening the stem of the rivet is inserted through the preformed opening 26a and 27a and is upset by means of pressure applied thereto by a heated riveting tool to form the head 28. The head thus formed will also have the reinforcing fibers 12 extending thereinto from the stem 23 such that this head will constitute a strong holding portion which is not likely to be broken away from the stem.

In Fig. 6 I show a staple 30 which is also made from fiber-reinforced plastic stock and can be produced by any suitable staple forming mechanism operating on such stock. The staple here shown comprises spaced arms or stems 31 joined together at one end thereof by means of a transverse holding portion or arch 32. The spaced arms 31 are pointed at their free ends as indicated at 31a. The reinforcing fibers 12 run longitudinally of the arms 31 and extend therefrom into the holding portion 32 and across the angular junctions 33 by which the arms are joined to the holding portion. By thus extending the reinforcing fibers across these junctions, the staple is strongly reinforced at these points and the tendency for the arms 31 to spread away from each other is substantially prevented. The staple 30 can be used for any of the purposes for which conventional metal staples are used, for example, it can be driven into wood or other material for holding wires or sheet material thereagainst.

In Fig. 8 I show a hollow rivet 35 which can be made from the fiber-reinforced hollow plastic stock 11. This rivet comprises a hollow stem 36 having an upset holding portion or head 37 at one end thereof. The reinforcing fibers 12 extend along the stem 36 and into the head 37 so that the latter will be reinforced and strongly connected with the stem. In addition to its use for making hollow rivets and other hollow parts, the hollow stock 11 can be used for pipes and conduits.

In Fig. 9 I show a fastening using the hollow rivet 35 of Fig. 8. The fastening here shown comprises a pair of plates 38 and 39 held in clamped or connected relation by means of the hollow rivet 35 extending through preformed openings 38a and 39a thereof. In forming this fastening, the stem of the rivet is inserted through the openings 38a and 39a and is upset by means of a suitable heated riveting tool applied thereto to form the upset head or holding portion 40 on the free end of the stem. The fibers 12 extend into the head 40 and reinforce the same.

For certain uses it may be desirable that one or more of the above described fastening members be colored. This can be achieved by using a colored plastic material in producing the fastening members.

Fig. 1 of the drawing shows one form of apparatus which can be used in producing the fiber reinforced plastic stock and in making therefrom the above described fastening members. The fiber strand 13 may be composed of any suitable fibers, for example, it may consist of vegetable fibers such as hemp or the like. The strand 13 can also be formed of hair or other animal fibers or could even be formed of small metal wires. The fibers constituting the strand 13 extend generally longitudinally thereof, although, if desired, the strand can be one formed with a twist therein for maintaining the fibers in more compact relation to each other. A suitable supply of the fiber strand 13 is provided by a rotatably mounted spool or drum 42 from which the strand is unwound by being pulled therefrom.

From the spool 42 the fiber strand 13 passes into an impregnating device 43. The device 43 comprises a suitable container or tank 44, containing a quantity of plastic material 14 in a soft or fluid condition. The plastic material can be maintained in this condition by supplying heat to the tank 44 as by means of the heating element 45 lying adjacent the wall of the tank and to which appropriate heating medium such as steam, electricity or the like is supplied. The container 44 may also include a suitable cover 46 at the top thereof.

A peripherally grooved drum 47 is rotatably mounted in the container 44 so that a portion of the drum dips or extends into the plastic material 14. The strand 13 passes into the impregnating tank 44 through a gripping device 48 and is wrapped around the peripherally grooved drum 47. After passing around the drum 47 the strand leaves the impregnating tank through a heated delivery member 49. As the strand 13 advances through the impregnating device 43 and travels around the drum 47, it is immersed in the plastic material 14 so as to become soaked or impregnated with such material. As the impregnated strand enters the delivery member 49, excess plastic material is scraped from the strand by means of a scraper 50 through which the strand passes.

The above mentioned gripping device 48 is provided for the purpose of maintaining the strand 13 under tension as it is pulled through the impregnating device 43. This gripping device may comprise a pair of gripping elements 48a and 48b of which the element 48a is stationary and the element 48b is a movable element urged toward the stationary element by the compression springs 51. The above mentioned delivery member 49 can be maintained in the desired heated condition by a heating element 52 embodied therein.

The impregnated strand leaving the device 43 is subjected to a cooling or solidifying treatment, preferably immediately after leaving the impregnating device. This solidifying treatment may comprise cooling the impregnated strand, as by passing the same through a cooling device 54 which is maintained at the desired temperature by circulating water or other cooling medium therethrough as by means of the supply and delivery pipes 54a and 54b. The cooling of the impregnated strand causes a hardening or solidification of the plastic material and results in the fiber-reinforced plastic rod or stock 10 which can then be used for making the above described fastening members or for any other desired purpose. In this instance, I show the stock 10 being supplied to a heading machine 55 which also embodies a feed mechanism 57 for pulling the strand 13 through the impregnating device 43 and feeding it into the dies of the heading machine.

The machine 56 can be a heading machine of any appropriate construction and which embodies a pair of cooperating gripipng and forming dies 60 and 61 and a heading or upsetting die 62. The dies 60 and 61 are reciprocably movable toward and away from each other for gripping and shaping the leading end or section of the stock 10 to form the stem portion of a fastening member which, in this instance, is in the form of the nail 15. The dies 60 and 61 can be actuated by cams or any other appropriate mechanism (not shown) and have heating elements or passages 63 therein, so that they can be maintained in a heated condition for softening and shaping the thermoplastic stock upon which they operate.

The heading die 62 is also a reciprocable die having a work engaging portion or end 62a which cooperates with the pair of dies 60 and 61 so as to engage and upset the end of the stock 10 while it is being gripped by such pair of dies. The upsetting operation forms the head 17 on the nail 15. The work-engaging portion of the die 62 is maintained in a heated condition as by means of heating elements or passages 65 therein. The desired actuation of the heading die 62, in properly timed relation to the forward feeding of the stock and the gripping thereof by the dies 60 and 61, can be obtained by means of the pivoted lever 66 and a rotatable cam 67 cooperating with such lever and driven by the shaft 68.

The feed mechanism 57 comprises a reciprocable head 70 having a spring actuated gripping element 71 therein. Reciprocating movement is imparted to the head 57 by a lever 72 which is actuated from the cam 67 by means of the cam follower 73. The gripping element 71 is shaped so that during movement of the head 70 toward the dies of the machine 56, the stock will be gripped and fed forward so as to bring the leading end of the stock into a desired position between the dies 60 and 61. Upon movement of the head 70 away from the dies of the machine 56, the element 71 releases its grip and permits the head to move over the stock.

In feeding the stock 10 to the dies of the machine 56 the leading end can be guided as by means of a pair of guide members 75 located just ahead of the dies 60 and 61. A reciprocable cut-off member 76 located alongside the dies 60 and 61 serves to sever the completed fastening member 15 from the stock, so that upon opening of the dies the completed fastening member can fall or be ejected therefrom. The cut-off member 76 can be actuated in properly timed relation from the same mechanism which actuates the dies 60 and 61.

From the foregoing description and the accompanying drawings it will now be understood that the present invention provides a novel form of construction for fastening members as well as a novel form of bar stock for producing such members. It will be seen also that in the fastening members above described the reinforcing fibers run substantially longitudinally in the stock and in the stem portions of the fastening members formed from such stock and extend into the heads or holding portions of the fastening members to strongly reinforce the same.

While I have illustrated and described the fastening members of my invention in considerable detail, it will be understood, of course, that I do not wish to be correspondingly limited but regard my invention as including all changes and modifications coming within the spirit of the invention and the scope of the appended claims.

Having thus described my invention, I claim:

1. A rivet or the like comprising a stem having a head on one end thereof, said stem and head being formed of solidified non-metallic plastic material having fibers therein running longitudinally of the stem and extending continuously into said head in laterally spreading relation, said plastic material being capable of being heat-softened to permit the formation of a fiber-reinforced head on the other end of said stem.

2. A nail formed of solidified non-metallic plastic material and having integrally connected stem and head portions and longitudinally extending reinforcing fibers in the stem portion and extending therefrom into the head portion in continuous and laterally spreading relation.

3. A fastening member of the type having a stem portion and a preformed head portion and adapted to be driven by the application of force to the head portion, comprising an elongated body of solidified non-metallic thermoplastic material consisting of a stem portion and a preformed head portion integral with said stem portion and connected with one end of the latter, and fibrous reinforcing strands running generally longitudinally in said body and extending in continuous relation from said stem portion into said head portion, the reinforcing strand portions contained in said head portion having a laterally spreading relation therein.

4. A fastening member as defined in claim 3, in which the fibrous reinforcing strands are vegetable fibres.

LEE B. GREEN.

REFERENCES CITED

The following references are of record in the file of this patent:

UNITED STATES PATENTS

| Number | Name | Date |
|---|---|---|
| 321,214 | Harvey | June 30, 1885 |
| 479,175 | Rogers | July 19, 1892 |
| 586,770 | Kempshall | July 30, 1897 |
| 617,064 | Traun | Jan. 3, 1899 |
| 959,876 | Neider | May 31, 1910 |
| 1,122,280 | Kempshall | Dec. 29, 1914 |
| 1,228,239 | Phillips | May 29, 1917 |
| 1,297,142 | Gibbons | Mar. 11, 1919 |
| 1,398,926 | Waite | Nov. 29, 1921 |
| 1,640,433 | Weldon | Aug. 30, 1927 |
| 1,869,105 | Johnson | July 23, 1932 |
| 1,974,160 | Peirson | Sept. 18, 1934 |
| 2,037,727 | Chapelle | Apr. 21, 1936 |
| 2,039,401 | Foges | May 5, 1936 |
| 2,061,815 | Taylor | Nov. 24, 1936 |
| 2,068,025 | Hayner | Jan. 19, 1937 |
| 2,092,807 | Chapelle | Sept. 14, 1937 |
| 2,204,664 | Clark | June 18, 1940 |
| 2,268,703 | Dickey | Jan. 6, 1942 |
| 2,274,542 | Griffiths | Feb. 27, 1942 |
| 2,316,766 | Beckwith | Apr. 20, 1943 |
| 2,319,537 | Delmonte | May 18, 1943 |
| 2,357,637 | Drypolcher | Sept. 5, 1944 |
| 2,361,735 | Beckwith | Oct. 31, 1944 |
| 2,366,274 | Luth et al. | Jan. 2, 1945 |
| 2,423,076 | Daly | July 1, 1947 |

FOREIGN PATENTS

| Number | Country | Date |
|---|---|---|
| 474,236 | Great Britain | Oct. 27, 1937 |